(12) United States Patent
Joo et al.

(10) Patent No.: US 9,620,903 B2
(45) Date of Patent: Apr. 11, 2017

(54) GROUNDING TYPE ELBOW CONNECTOR

(71) Applicant: PYUNGIL CO., LTD., Gyeonggi-do (KR)

(72) Inventors: Jong Min Joo, Gyeonggi-do (KR); Kyoung Sun Choi, Seoul (KR); Jin Sub An, Seoul (KR); Chung Mo Je, Gyeonggi-do (KR)

(73) Assignee: PYUNGIL CO., LTD., Gyeonggi-do (KR)

( * ) Notice: Subject to any disclaimer, the term of this patent is extended or adjusted under 35 U.S.C. 154(b) by 0 days.

(21) Appl. No.: 15/023,988

(22) PCT Filed: Oct. 31, 2013

(86) PCT No.: PCT/KR2013/009773
§ 371 (c)(1),
(2) Date: Mar. 22, 2016

(87) PCT Pub. No.: WO2015/046662
PCT Pub. Date: Apr. 2, 2015

(65) Prior Publication Data
US 2016/0240979 A1    Aug. 18, 2016

(30) Foreign Application Priority Data

Sep. 25, 2013  (KR) .......................... 10-2013-0113688

(51) Int. Cl.
*H01R 13/53* (2006.01)
*H01R 13/652* (2006.01)
*H02G 15/06* (2006.01)
*H01R 4/64* (2006.01)
*H01R 13/66* (2006.01)

(52) U.S. Cl.
CPC ............. *H01R 13/652* (2013.01); *H01R 4/64* (2013.01); *H01R 13/53* (2013.01); *H01R 13/6683* (2013.01); *H01R 13/6691* (2013.01); *H02G 15/06* (2013.01)

(58) Field of Classification Search
CPC ........ H01R 13/652; H01R 13/53; H01R 4/64; H01R 13/6683; H01R 13/6691
USPC ........................................ 439/100, 181, 921
See application file for complete search history.

(56) References Cited

U.S. PATENT DOCUMENTS

| 7,690,933 B1* | 4/2010 | Smith ................... H01R 13/44 439/181 |
| 7,972,155 B1* | 7/2011 | Siebens ................. H01R 13/53 439/181 |
| 8,221,144 B1* | 7/2012 | Williams ................ H01R 4/20 439/181 |

FOREIGN PATENT DOCUMENTS

| KR | 200347127 | 4/2004 |
| KR | 1020080024646 | 3/2008 |
| KR | 101066526 | 9/2011 |

(Continued)

*Primary Examiner* — Khiem Nguyen
(74) *Attorney, Agent, or Firm* — I P & T Group LLP

(57) ABSTRACT

A grounding type elbow connector includes an insulation plug having an electrically-conductive stud bolt, an insulation body, and an insulation rod that is detachably fitted into a through-hole of the insulation body. A grounding unit having a grounding rod and to which a grounding cable is connected is connected alone, or selectively coupled in a state a grounding inspection connection unit is connected, to the elbow connector after the insulation body is dissembled from the elbow connector.

4 Claims, 12 Drawing Sheets

(56) References Cited

FOREIGN PATENT DOCUMENTS

| KR | 101251610 | 4/2013 |
|----|-----------|--------|
| KR | 101284341 | 7/2013 |

\* cited by examiner

GROUNDING TYPE ELBOW CONNECTOR

This application is a national stage application of PCT/KR2013/009773 filed on Oct. 31, 2013, which claims priority of Korean patent application number 10-2013-0113688 filed on Sep. 25, 2013. The disclosure of each of the foregoing applications is incorporated herein by reference in its entirety.

TECHNICAL FIELD

The present invention relates generally to a grounding type elbow connector having a grounding connection structure to allow a cable, which is connected to a bushing of a ground switch by an elbow connector, to be grounded by the elbow connector itself. More particularly, the present invention relates to a grounding type elbow connector that enables a cable to be grounded by connecting a grounding unit alone, or additionally along with selective adaptation of a grounding inspection connector to ensure safety of a ground.

BACKGROUND ART

A conventional elbow connector has been widely disclosed and is well known as a medium connector that facilitates the connection between a cable and a high-voltage device such as a switch, a transformer, or the like in a padmount.

Such an elbow connector is connected to or disconnected from, for example, a bushing insert, attached to a bushing well of a switch so as to be connected to the switch via a cable.

An exemplary elbow connector is disclosed in Patent Document 1 (Korean Unexamined Patent Publication No. 10-2008-0024646, published on Mar. 19, 2008).

That is, the elbow connector of Patent Document 1 includes an insulation housing that has a multi-layer structure, in which an internal insulating layer formed of a rubber-like insulating material is internally and externally surrounded by a semi-conductive protection layer formed of a rubber-like elastomer, such that a cable receiving part in a vertical direction and a bushing connection part and a voltage defection part in a horizontal direction are formed in a horizontally symmetric manner.

The elbow connector also includes a conductor that is assembled in a state of protruding in the central portion of the bushing connection part and the voltage detection part while forcedly engaging wires of a high voltage cable through an internal space of the cable receiving part and to which a stud bolt screwed onto a bushing insert attached to a switch is assembled.

Further, the elbow connector includes an insulation plug in which a fastening nut and a test point, which are screwed onto a rear end of the stud bolt, are insert-molded onto front and rear ends of an insulating material so as to be coupled to the voltage detection part, and an insulation cap that covers the test point exposed to a rear end of the insulation plug.

The cable includes an adapter assembled onto an insulation cladding in order to prevent shaking in the cable receiving part and to facilitate sealed assembly.

The elbow connector of Patent Document 1 has a function of detecting a voltage using the test point of the insulation plug so as to check an activated state of a distribution line or detecting a phase of power source side and load side and checking an open phase state thereof.

In order to eliminate the drawbacks of Patent Document 1 wherein the protruded length of the voltage detection part side is increased, a technique is disclosed in Patent Document 2 (Korean Patent No. 10-1066526, registered on Sep. 15, 2011) in which an asymmetric structure is formed such that a length of the voltage detection part is made smaller than a bushing connection part, and a manipulation ring of the insulation cap is made into a folded type, thereby reducing the protruded length of the voltage detection part to the max.

Although Patent Documents 1 and 2 have a function of checking an activated state of a distribution line or detecting a phase of power source side and load side and checking an open phase state thereof, configurations of Patent Documents have a problem in that, when a cable is intended to be grounded as necessary, the configurations should have a switch having a separate ground switch therein. Further, in the case of a conventional elbow connector having no grounding function. It is first disconnected from a switch and then a separate grounding elbow connector is connected to the switch so as to check a voltage and ground itself, leading to troublesome, complex work and providing inconvenience and limitations in use.

In other words, a conventional elbow connector has drawbacks in that, since it has no grounding function, upon replacement of a cable in a switch or line working, a switch having a separate grounding switch therein should be employed, or a separate grounding connector should be connected thereto so as to check a voltage and ground itself, leading to complex replacement of a cable, increased size of the switch, and limited range in use.

DISCLOSURE

Technical Problem

Accordingly, the present invention has been made keeping in mind the above problems occurring in the related art, and an object of the present invention is to provide a grounding type elbow connector having a grounding insulation plug therein to provide a direct, simple, and safe ground, thereby facilitating easy use and maximizing usability thereof.

Another object of the present invention is to provide a grounding type elbow connector capable of selectively employing a grounding inspection connection unit to inspect a grounding state upon grounding working.

Technical Solution

In order to accomplish the above objects, the present invention provides a grounding type elbow connector including: an insulation housing formed of an electrically-insulating material and having a horizontally-symmetric structure in which a cable receiving part extending in a vertical direction crosses a bushing connection part and a voltage detection part extending in a horizontal direction; a conductor assembled through the cable receiving part into the center of an internal space between the bushing connection part and the voltage detection part and to which a cable is connected; an insulation plug formed of an insulation resin and assembled to the voltage detection part; and an insulation cap electrically insulating the insulation plug, wherein the insulation plug includes: an insulation body in which an electrically-conductive stud bolt is insert-formed on a front end of the insulation body and a connecting through-hole is formed inside the insulation body at a rear side of the stud bolt; and an insulation rod that is detachably fitted into the through-hole, wherein a grounding unit having a grounding rod and to which a grounding cable is connected is connected alone, or selectively coupled in a state a grounding inspection connection unit is connected, to the elbow connector after the insulation body is dissembled from the elbow connector.

The insulation body may include an outer insulating rubber layer (epoxy rubber layer) and a semi-conductive rubber layer that is formed in the outer insulating rubber layer, wherein the stud bolt is insert-coupled in the semi-conductive rubber layer, and an elastic connection ring is insert-formed and connected in an inner hole of the semi-conductive rubber-layer so as to allow the grounding rod to be connected therethrough.

The grounding inspection connection unit may include: a test rod that is to be connected to the stud bolt through the through-hole of the insulation plug; a switch body to which the test rod is connected; a connection body that has a connection hole, through which the grounding rod of the grounding unit is connected while supporting the switch body; and an I-bolt that is screwed into the switch body through the rear side of the connection body.

The switch body may include: an ON/OFF connection button for the connection of the test rod; LED lamps that indicate normal or abnormal connection of the test rod according to the operation of the OH/OFF connection button; and a speaker that voice-outputs a grounded state.

Advantageous Effects

According to the present invention, the elbow connector can be simply grounded in an activated state of a switch, and enables replacement of failed or possibly-failed components of equipment, thereby providing an effect of improving field workability and of, since, unlike a conventional elbow connector, there is no need to have a separate grounding switch unit in a switch, removing failure factors of the switch and thus extending a lifetime thereof.

Further, according to the present invention, the elbow connector can be easily replaced along with safe checking of a grounding state through a connection unit without using a separate elbow connector used only for grounding.

Furthermore, according to the present invention, grounding work can be directly and simply performed in a field thus providing improved workability, and no separate elbow connector for grounding is needed, thereby reducing cost.

BEST MODE

The present invention is directed to a grounding type elbow connector in which an insulation plug connected to a voltage detection part of an insulation housing is provided with a grounding function, so that, if needed, a ground is directly obtained without separating the elbow connector, ensuring safety of worker and thereby obtaining a convenient, safe, and secure ground.

The present invention will now be described in detail with reference to the accompanying drawings.

Figure 1:
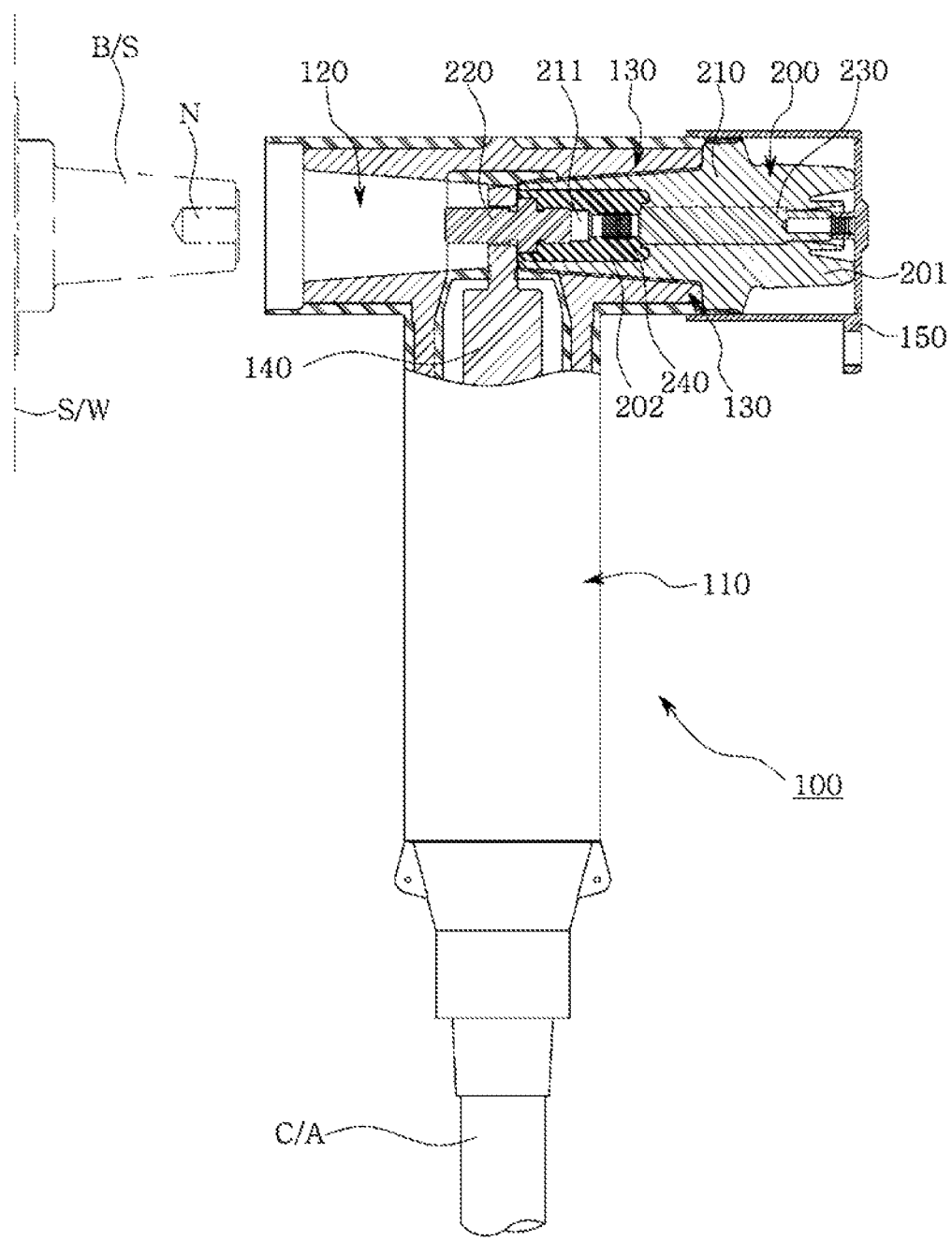
FIG. 1 is a cross-sectional view of a grounding type elbow connector according to an embodiment of the present invention.
Figure 2:
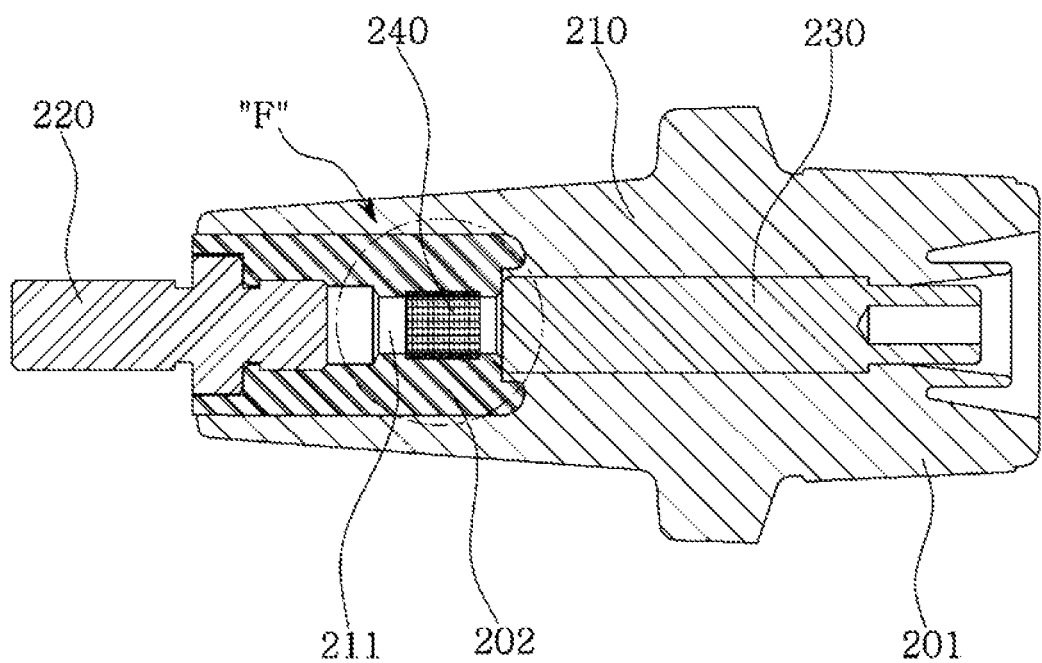
FIG. 2 is a cross-sectional view of an insulation plug as a major element of the elbow connector.
Figure 3:
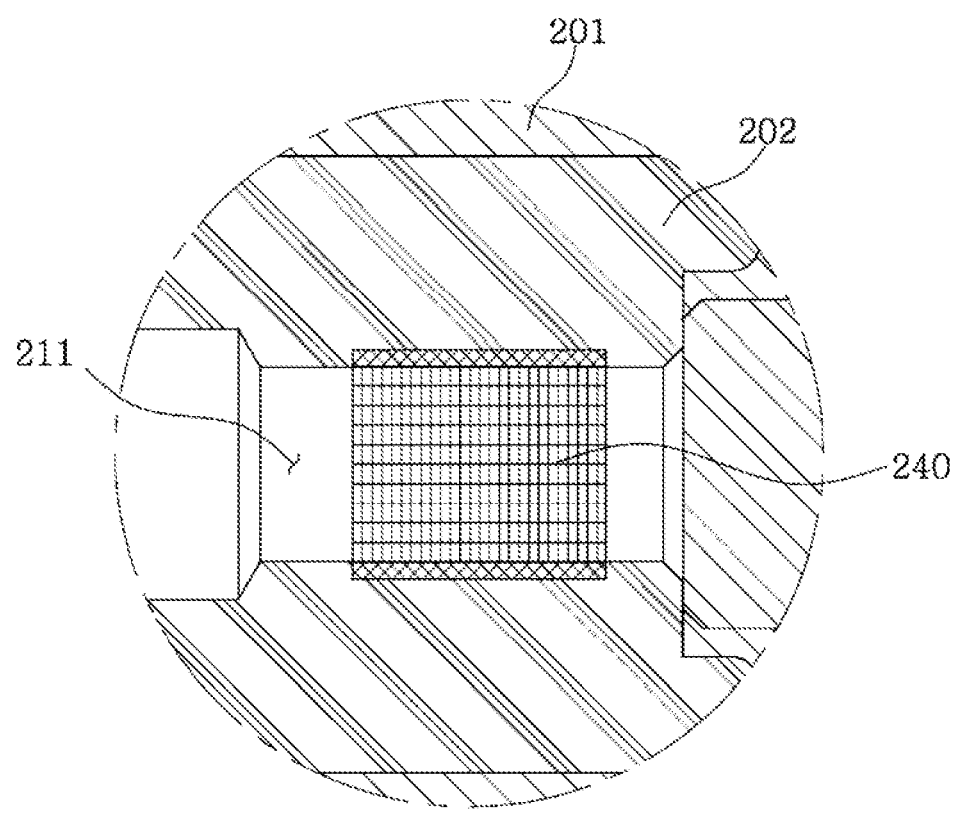
FIG. 3 is an enlarged view of section "F" in FIG. 2.

FIG. 1 is a cross-sectional view of a grounding type elbow connector according to an embodiment of the present invention, FIG. 2 is a cross-sectional view of an insulation plug as a major element of the elbow connector, and FIG. 3 is an enlarged view of a part of FIG. 2.

Referring to these drawings, the elbow connector is generally used as a means for connecting ground or underground equipment, such as a transformer, a high-voltage switch (S/W) or the like, and a distribution line.

The elbow connector includes an insulation housing 100 that is coupled to a bushing (B/S) assembled to a transformer or a switch (S/W). The insulation housing is formed of an electrically-insulating material, and has a horizontally-symmetric T-type structure in which a cable receiving part 110 extending in a vertical direction crosses a bushing connection part 120 and a voltage detection part 130 that extend in a horizontal direction.

A conductor 140 is assembled into the insulation housing 100 while being connected with a cable (C/A) such that and end of the conductor protrudes through the cable receiving part 110 into the center of an internal space between the bushing connection part 120 and the voltage detection part 130.

The conductor is connected with a bushing (B/S) assembled to the switch (S/W) through the bushing connection part 120.

The voltage detection part 130 provided opposite to the bushing connection part 120 is provided with a grounding insulation plug 200 that has a grounding function an essential element of the present invention, so that an internal space between the cable receiving part 110 and the bushing connection part 120 is hermetically insulated.

The insulation plug 200 includes: an insulation body 210 in which an electrically-conductive stud bolt 220 is insert-formed on a front end of the insulation body 210 and a connecting through-hole 211 is formed inside the insulation body 210 at a rear side of the stud bolt 220; and an insulation rod 230 that is detachably fitted into the through-hole 211.

The stud bolt 200 is perpendicularly screwed through the conductor 140 and then is screw-coupled with a nut (N) insert-formed in the bushing (B/S) of the switch (S/W).

In this assembled state, an insulation cap 150 is interference-fitted thereto, thereby covering and insulating the insulation plug 200.

The insulation body 210 includes an outer insulating rubber layer 201 and a semi-conductive rubber layer 202 that is formed in the outer insulating rubber layer 201. The stud bolt 220 is insert-coupled in the semi-conductive rubber layer 202 so as to allow a uniform electric field.

An elastic connection ring 240 is insert-formed and connected in an inner hole of the semi-conductive rubber layer 202.

The elastic connection ring 240 is provided, on an inner circumference thereof, with a plurality of elastic projections by which an object to be fitted through the inner circumference is firmly fitted, thereby increasing a fitting force therebetween.

A grounding operation using the elbow connector is performed as shown in FIGS. 4 to 7.

Figure 4:
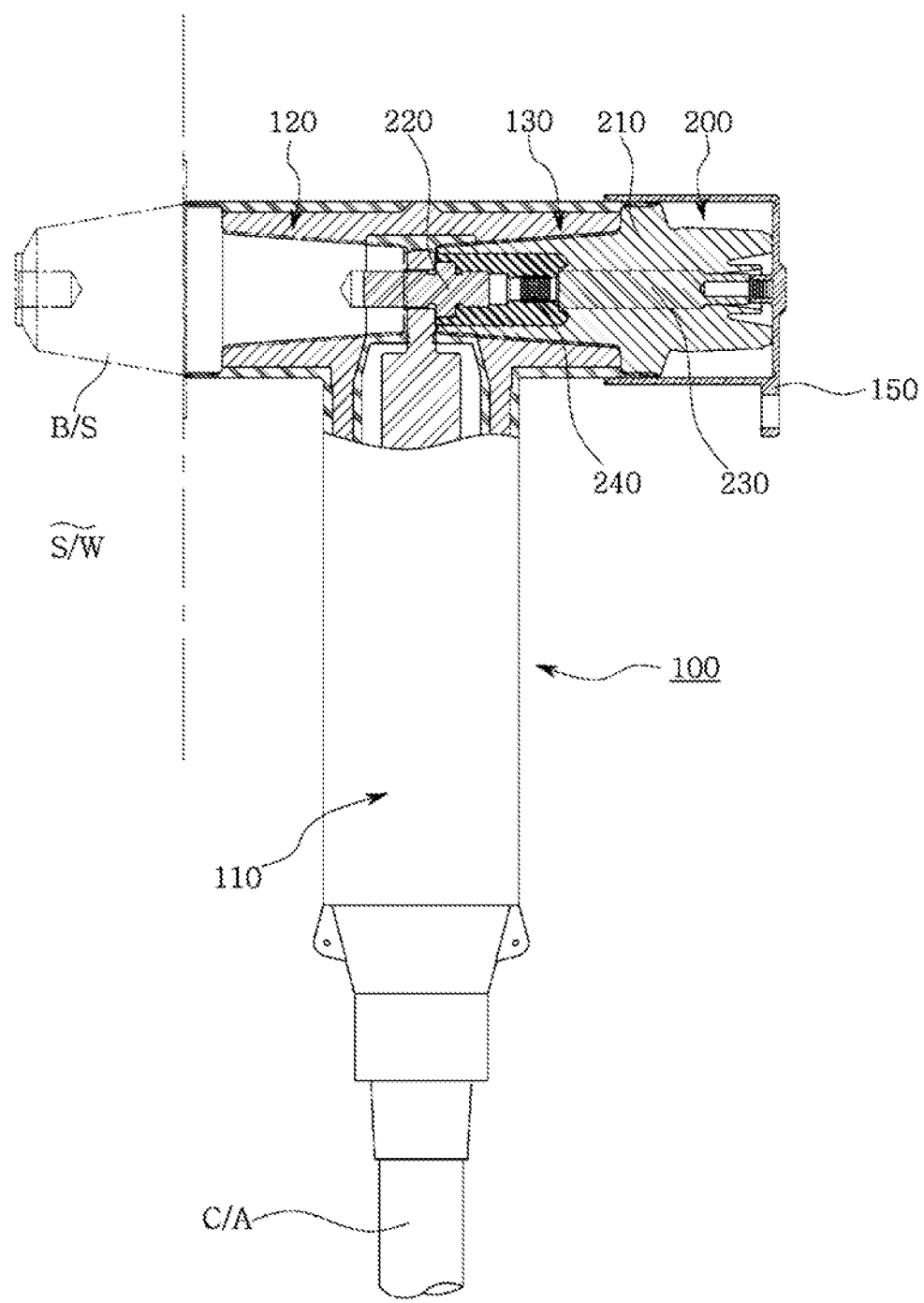
FIGS. 4 to 7 are views showing sequential connection of a grounding unit according to the operation of the present invention.

FIG. 4 shows a normal operation state in which the elbow connector is connected with the bushing (B/S) of the switch (S/W) through the bushing connection part 120 of the insulation housing 100.

Figure 5:
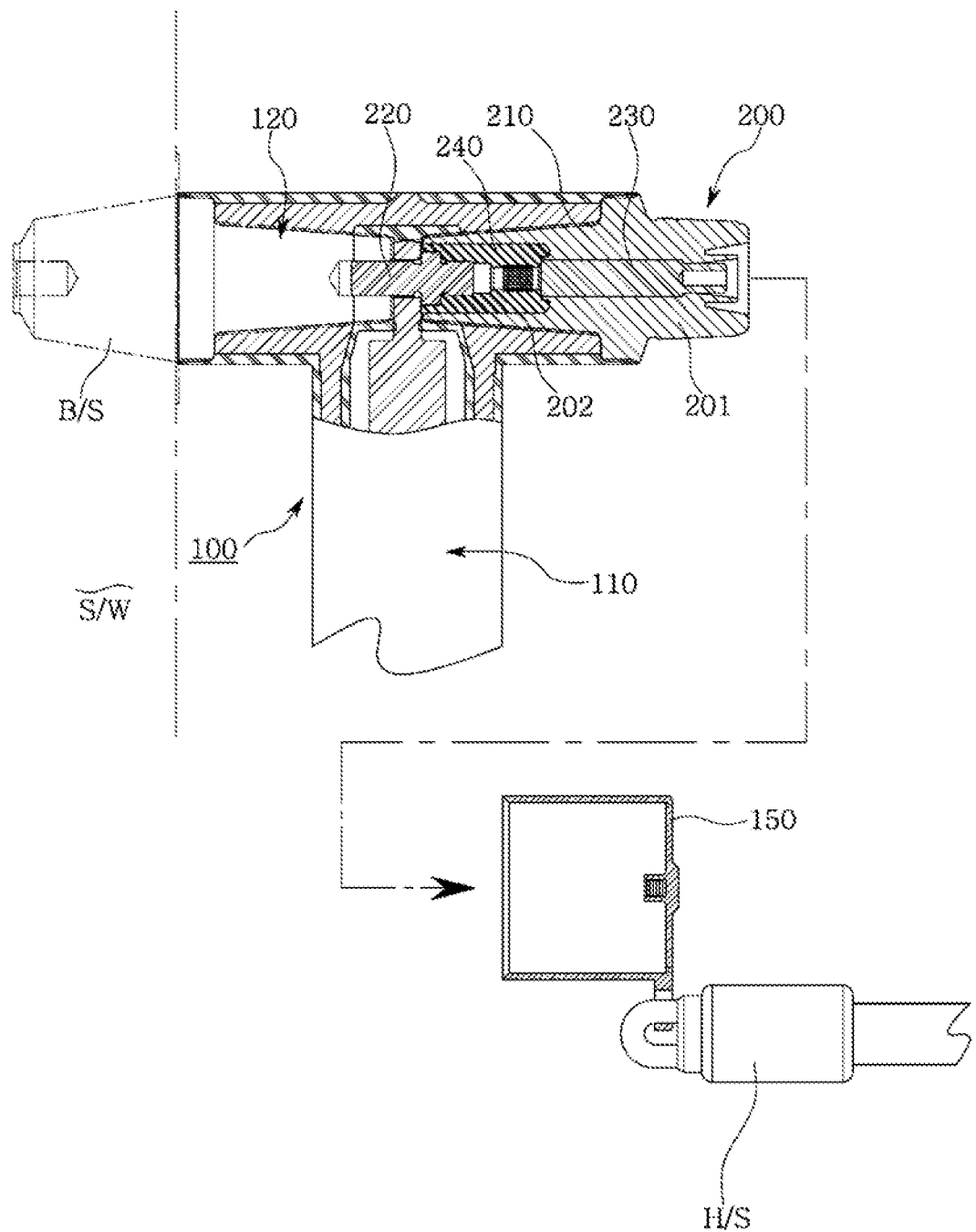

In this normal operation state, the insulation cap 150 is decoupled from the voltage detection part 130 using a hot stick (H/S) as shown in FIG. 5.

Figure 6:
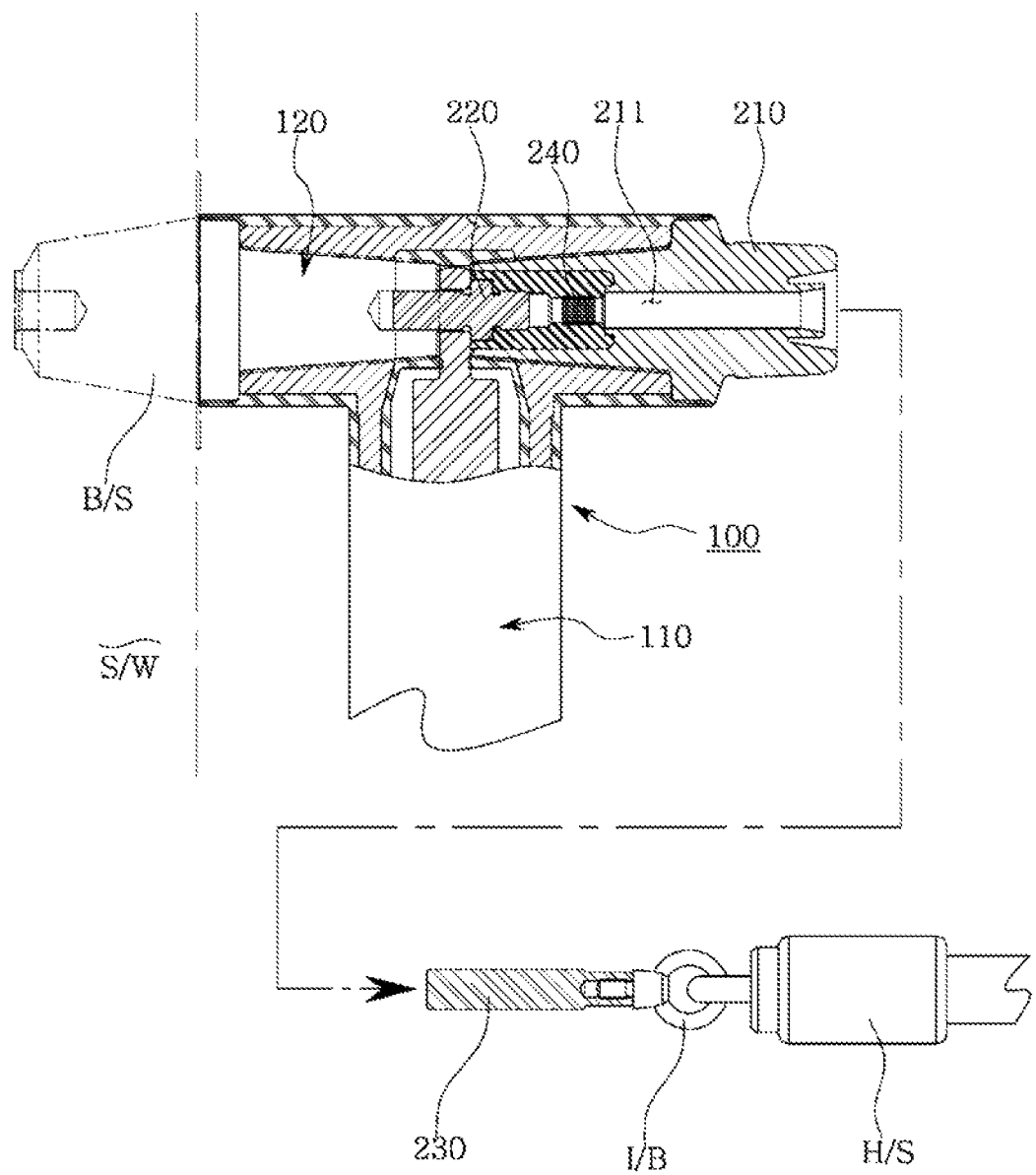

After the insulation cap ISO is decoupled, as shown in FIG. 6, an I-bolt (I/B) is connected to the hot stick (H/S) and is screwed into the insulation rod 230 of the insulation plug 200, and then the insulation rod 230 is dissembled from the through-hole 211.

Figure 7:
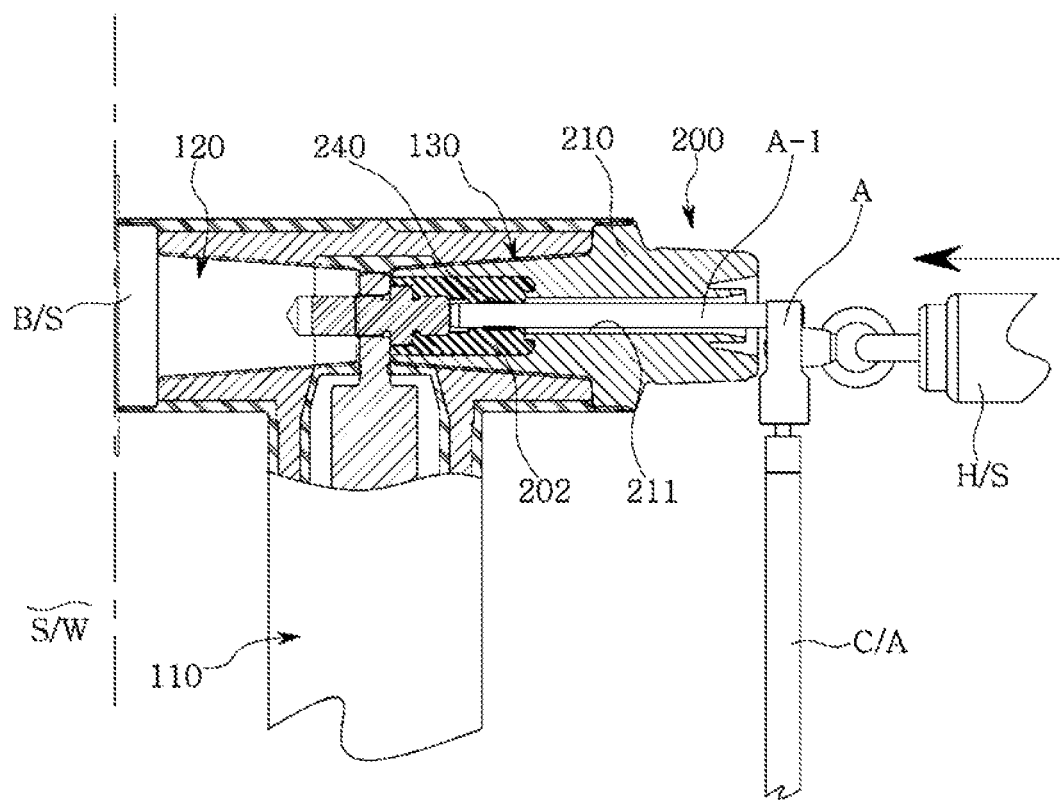

After the insulation rod 230 is dissembled, as shown in FIG. 7, a grounding unit A connected with a ground cable (CM) is connected to the hot stick (H/S), and a grounding rod A-1 is inserted into the through-hole 211 of the insulation body 210 of the insulation plug 200 so that the grounding rod comes into contact with a rear end of the stud bolt 220 assembled to the front end of the insulation body 210.

Here, the grounding rod A-1 is firmly connected by the elastic projections formed on the inner circumference of the elastic connection ring 240 coupled in the semi-conductive rubber layer 202.

After the grounding unit A connecting the grounding cable (C/A) is directly connected to the elbow connector that has been connected with the switch (S/W), an operator can safely perform maintenance of a distribution line.

That is, in a normal operation state in which the elbow connector is connected with the switch (S/W) and the insulation cap 150 is attached to the elbow connector, when a ground is required, as described above, the insulation rod 230 of the insulation plug 200 is dissembled and the grounding rod A-1 of the grounding unit A, to which the grounding cable (C/A) is connected, is directly connected through the elbow connector in order to perform a grounding operation.

In the meantime, for safe, precise maintenance of a distribution line, according to the present invention, the grounding unit A can be connected to the insulation plug 200 by means of a grounding inspection connection unit 300.

Figure 8:
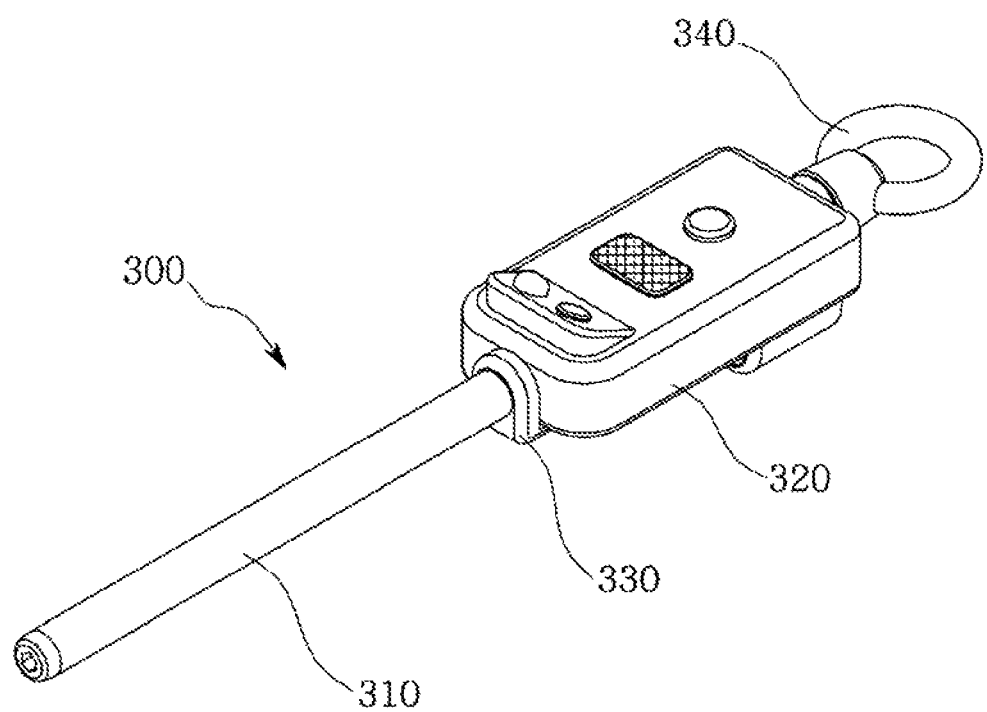
FIG. 8 is a perspective view of a grounding inspection connection unit to be employed by the elbow connector.
Figure 9:
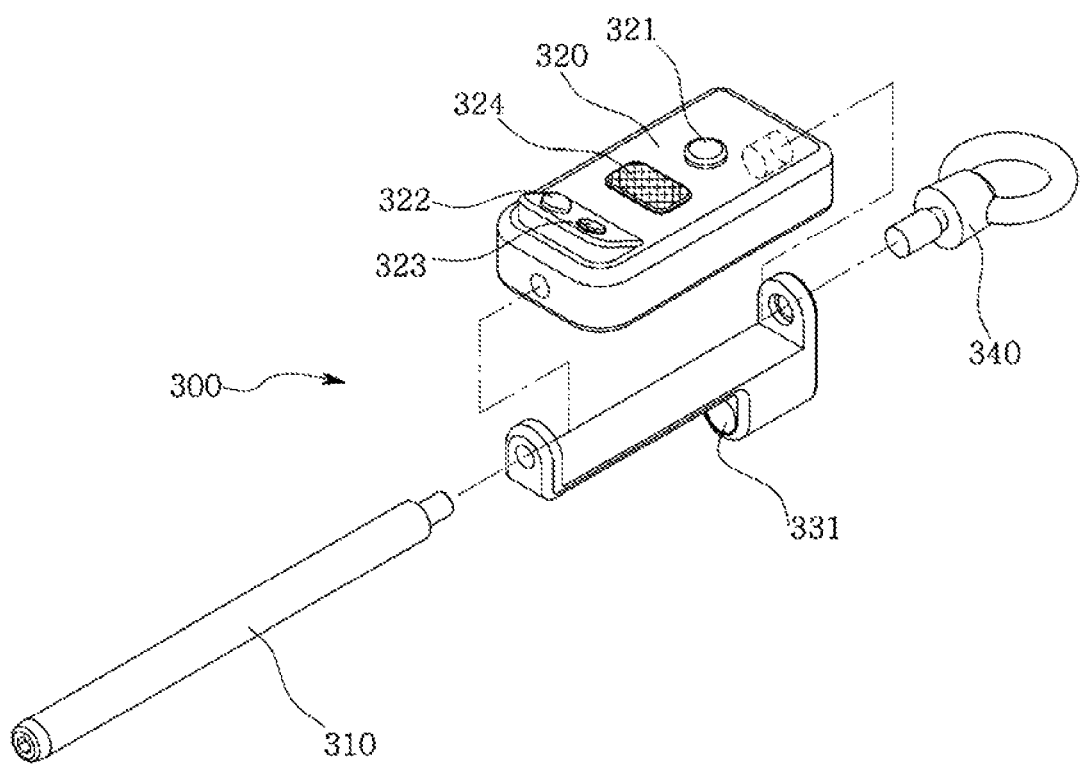
FIG. 9 is an exploded perspective view of the grounding inspection connection unit of FIG. 8.

That is, the grounding inspection connection unit 300 that can be used in a state of being connected to the elbow connector includes a test rod 310 that is to be connected to a rear end of the stud bolt 220 through the through-hole 211 axially formed through the insulation body 210 of the insulation plug 200; a switch body 320 to which the test rod is connected; a connection body 330 that has a connection hole 331, through which the grounding rod A-1 of the grounding unit A is connected, while supporting the switch body 320; and a fixing eye-bolt 340 that is fixedly screwed into the switch body 320 through the rear side of the connection body 330, as shown in FIGS. 8 and 9.

Here, the switch body 320 may preferably include an OK/OFF connection button 321 for the connection of the test rod 310, LED lamps 322 and 323 that indicate normal or abnormal connection of the test rod according to the operation of the ON/OFF connection button 321, and a speaker 324 that voice-outputs a grounded state and other operation state.

Figure 10:
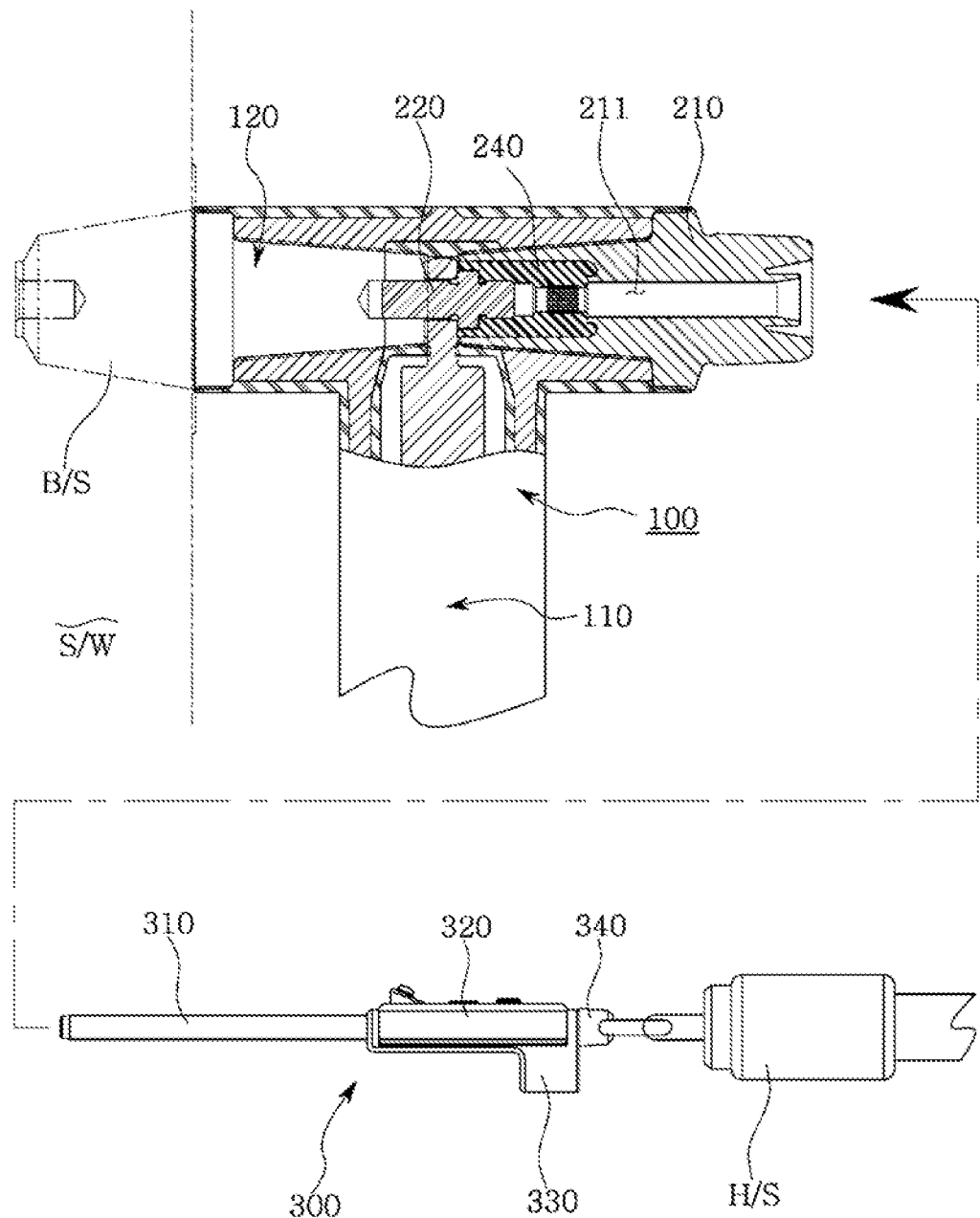
FIGS. 10 to 12 are views showing sequential connection of the grounding unit using the grounding inspection connection unit to be employed by the elbow connector.

After the insulation rod 230 of the insulation plug 200 is dissembled in a process as shown in FIGS. 5 and 6, the hot stick (H/S) is connected to the fixing eye-bolt 340 of the grounding inspection connection unit 300 as shown in FIG. 10.

Figure 11:
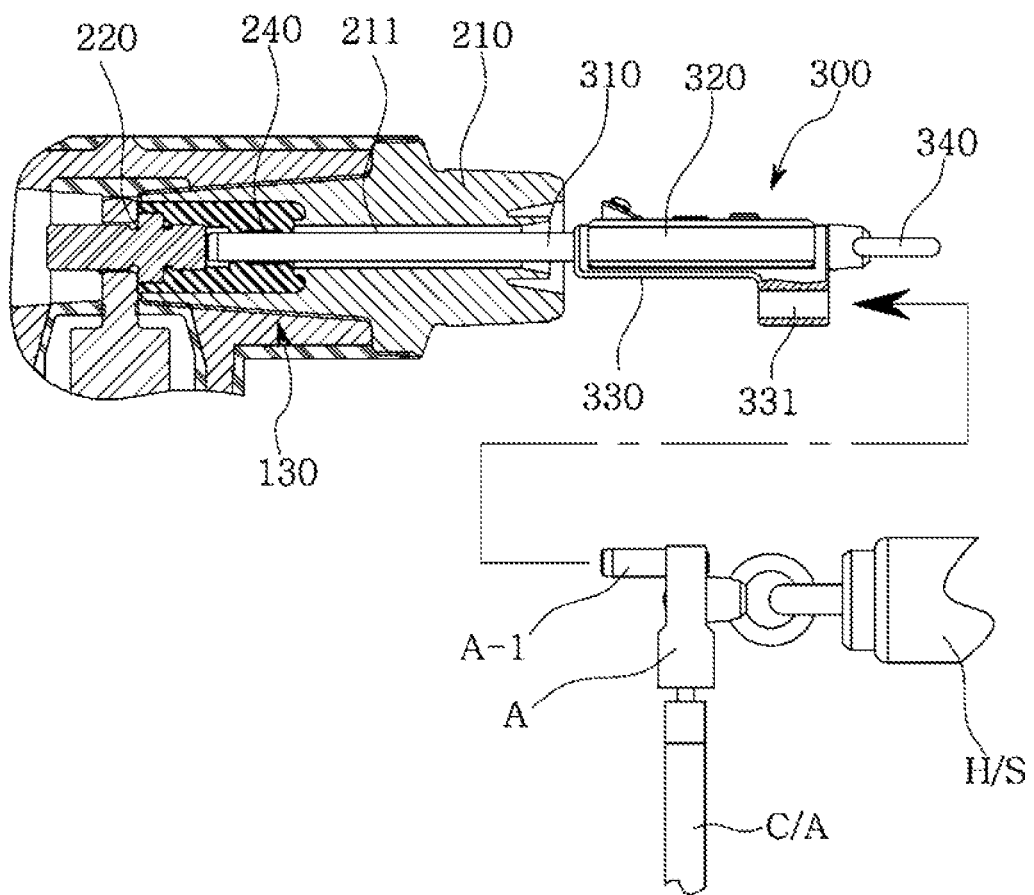

In this assembled state, as shown in FIG. 11, the test rod 310 is inserted through the through-hole 211 of the insulation body 210 and is connected to the rear side of the stud bolt 220 assembled to the front side of the insulation body 210.

Figure 12:
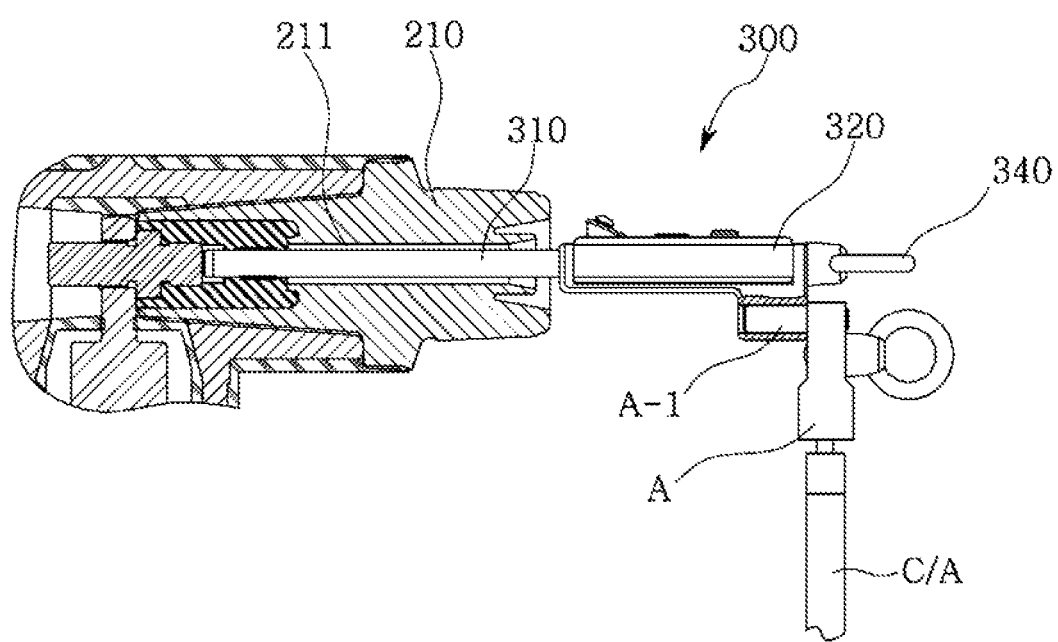

In this assembled state, as shown in FIG. 12, the grounding rod A-1 of the grounding unit A is inserted into the connection hole 331 of the connection body 330.

In this assembled state, when the ON/OFF connection button 321 of the switch body 320 is operated, the connection state of the test rod 310 can be indicated with a visual sign by the LED lamps 322 and 323 as well as a voice sign by the speaker 324.

Since grounding work is performed after the grounded state has been safely and securely indicated, a worker can easily perform the grounding work.

Although the preferred embodiments of the present invention have been disclosed in the detailed description, it is possible to make various modifications without departing from the scope of the invention. Therefore, the scope of the invention should not be limited to the above-mentioned embodiments, but may be defined by the accompanying claims and equivalents thereof.

<Description of the Reference Numerals in the Drawings>

| | |
|---|---|
| 100: Insulation housing | 130: Voltage detection part |
| 200: Grounding insulation plug | |
| 210: Insulation body | 211: Though-hole |
| 220: Stud bolt | 230: Insulation rod |
| 240: Elastic connection ring | |
| 300: Grounding inspection connection unit | |
| 310: Test rod | 320: Switch body |
| 330: Connection body | 340: Fixing eye-bolt |

INDUSTRIAL APPLICABILITY

The present invention is very conveniently and usefully applicable to various industrial applications in that, when a ground is required during maintenance of a distribution line, without using a separate elbow connector used only for grounding, an insulation cap is dissembled and then a grounding unit or a grounding inspection connection unit for securing safety when the grounding unit is used can be immediately assembled, without a change in design of a switch.

The invention claimed is:

1. A grounding type elbow connector comprising:
an insulation housing formed of an electrically-insulating material and having a horizontally-symmetric structure in which a cable receiving part extending in a vertical direction crosses a bushing connection part and a voltage detection part extending in a horizontal direction;
a conductor assembled through the cable receiving part into a center of an internal space between the bushing connection part and the voltage detection part and to which a cable is connected;
an insulation plug formed of an insulation resin and assembled with the voltage detection part; and
an insulation cap electrically insulating the insulation plug, wherein the insulation plug includes:
an insulation body in which an electrically-conductive stud bolt is insert-formed on a front end of the insulation body and a connecting through-hole is formed inside the insulation body at a rear side of the stud bolt; and
an insulation rod that is detachably fitted into the through-hole,
wherein a grounding unit having a grounding rod and to which a grounding cable is connected is connected alone, or selectively coupled in a state a grounding inspection connection unit is connected, to the elbow connector after the insulation body is dissembled from the elbow connector.

2. The grounding type elbow connector of claim 1, wherein the insulation body includes an outer insulating rubber layer comprising an epoxy rubber layer and a semi-conductive rubber layer that is formed in the outer insulating rubber layer, wherein the stud bolt is insert-coupled in the semi-conductive rubber layer, and an elastic connection ring is insert-formed and connected in an inner hole of the semi-conductive rubber layer so as to allow the grounding rod to be connected therethrough.

3. The grounding type elbow connector of claim 1, wherein the grounding inspection connection unit includes: a test rod that is to be connected to the stud bolt through the through-hole of the insulation plug; a switch body to which the test rod is connected; a connection body that has a connection hole, through which the grounding rod of the grounding unit is connected, while supporting the switch body; and an I-bolt that is screwed into the switch body through the rear side of the connection body.

4. The grounding type elbow connector of claim 3, wherein the switch body includes: an ON/OFF connection button for the connection of the test rod; LED lamps that indicate normal or abnormal connection of the test rod according to the operation of the ON/OFF connection button; and a speaker that voice-outputs a grounded state.

* * * * *